(12) United States Patent
Bauer et al.

(10) Patent No.: US 9,309,999 B2
(45) Date of Patent: Apr. 12, 2016

(54) DIRECTIONAL FLUID LINE

(75) Inventors: Andreas Bauer, Obernburg (DE); Christoph Steinkamp, Biebergemuend (DE); Martin Anders, Schellerten (DE)

(73) Assignee: NORMA GERMANY GMBH, Maintal (DE)

( * ) Notice: Subject to any disclaimer, the term of this patent is extended or adjusted under 35 U.S.C. 154(b) by 906 days.

(21) Appl. No.: 13/426,982

(22) Filed: Mar. 22, 2012

(65) Prior Publication Data

US 2012/0247604 A1 Oct. 4, 2012

(30) Foreign Application Priority Data

Mar. 29, 2011 (DE) .......... 10 2011 015 388

(51) Int. Cl.
| F16L 11/00 | (2006.01) |
|---|---|
| F16L 11/11 | (2006.01) |
| F16L 9/06 | (2006.01) |
| F16L 11/15 | (2006.01) |

(52) U.S. Cl.
CPC .............. *F16L 11/111* (2013.01); *F16L 9/06* (2013.01); *F16L 11/15* (2013.01)

(58) Field of Classification Search
USPC ................................ 138/121, 122
See application file for complete search history.

(56) References Cited

U.S. PATENT DOCUMENTS

| 3,259,405 A * | 7/1966 | Heller ............ 285/226 |
|---|---|---|
| 3,908,704 A * | 9/1975 | Clement .......... A61F 2/06 128/204.18 |
| 4,145,387 A | 3/1979 | Hegler et al. |
| 4,303,104 A | 12/1981 | Hegler et al. |
| 4,340,089 A * | 7/1982 | Freiherr von Arnim et al. ............ 138/121 |
| 4,773,458 A | 9/1988 | Touzani |
| 5,814,384 A | 9/1998 | Akkapeddi et al. |
| 5,850,855 A * | 12/1998 | Kerschbaumer et al. ..... 138/137 |
| 6,361,248 B1 * | 3/2002 | Maestro ............ 405/49 |
| 7,597,119 B2 * | 10/2009 | Boettner .......... 138/119 |
| 2006/0191585 A1 | 8/2006 | Mori |
| 2007/0221282 A1 * | 9/2007 | Sakazaki et al. ........ 138/121 |
| 2010/0089479 A1 * | 4/2010 | Smith ........ F16L 11/16 138/119 |
| 2010/0300569 A1 * | 12/2010 | Degen et al. ......... 138/121 |

FOREIGN PATENT DOCUMENTS

| CN | 87107832 | 6/1988 |
|---|---|---|
| CN | 1157001 | 8/1997 |
| CN | 101836022 | 9/2009 |
| CN | 101813219 | 8/2010 |
| DE | 17 75 513 | 7/1971 |
| DE | 78 36 197 | 4/1979 |

(Continued)

OTHER PUBLICATIONS

Russian Office action dated Apr. 19, 2013 conducted in counterpart Russia Appln. No. 2012111459/06(017242) (w/ Engllish language translation).

(Continued)

*Primary Examiner* — James Hook

(74) *Attorney, Agent, or Firm* — Greenblum & Bernstein, P.L.C.

(57) ABSTRACT

Fluid line and method of making fluid line that includes an inner contour structured with wave peaks and wave troughs. Each wave peak has a front flank and a rear flank, and the front flanks are structured with an inclination angle, relative to a longitudinal axis, shallower than an inclination angle of the rear flanks.

18 Claims, 1 Drawing Sheet

(56) References Cited

FOREIGN PATENT DOCUMENTS

| | | |
|---|---|---|
| DE | 10 2004 001 109 | 8/2004 |
| DE | 10 2007 015 134 | 10/2007 |
| EP | 0436923 | 7/1991 |
| EP | 0 863 351 | 9/1998 |
| EP | 2 154 404 | 2/2010 |
| FR | 1385986 | 1/1965 |
| GB | 1525450 | 9/1978 |
| JP | 2000-283348 | 10/2000 |
| JP | 3122115 | 10/2000 |
| JP | 2004-076929 | 3/2004 |
| JP | 2006-046378 | 2/2006 |
| JP | 2007-285515 | 11/2007 |
| JP | 2008-248873 | 10/2008 |
| JP | 2009-150458 | 7/2009 |
| KR | 10-0163478 | 1/1999 |
| SU | 708992 | 1/1980 |

OTHER PUBLICATIONS

Korean Office action conducted in counterpart Korean Appln. No. 10-2012-0031647 (Nov. 12, 2013) (w/ English language translation).
English language translation of Japanese Office action conducted in counterpart Japan Appln. No. 2012-073279 (Nov. 5, 2013).
Korean Office action conducted counterpart Korean Appin. No. 10-2012-0031647 (Jun. 19, 2013) (w/ English language translation).
Japanese Office action conducted in counterpart Japanese Appin. No. 2012-073279 (May 28, 2013) (w/ English language translation).
China Office action conducted in counterpart China Appln. No. 201210085210.6 (Dec. 4, 2013) (w/ English language translation).
European Office action conducted in counterpart European Appln. No. 12000204.3-1758 (Jan. 26, 2015) (w/ English language translation).

* cited by examiner

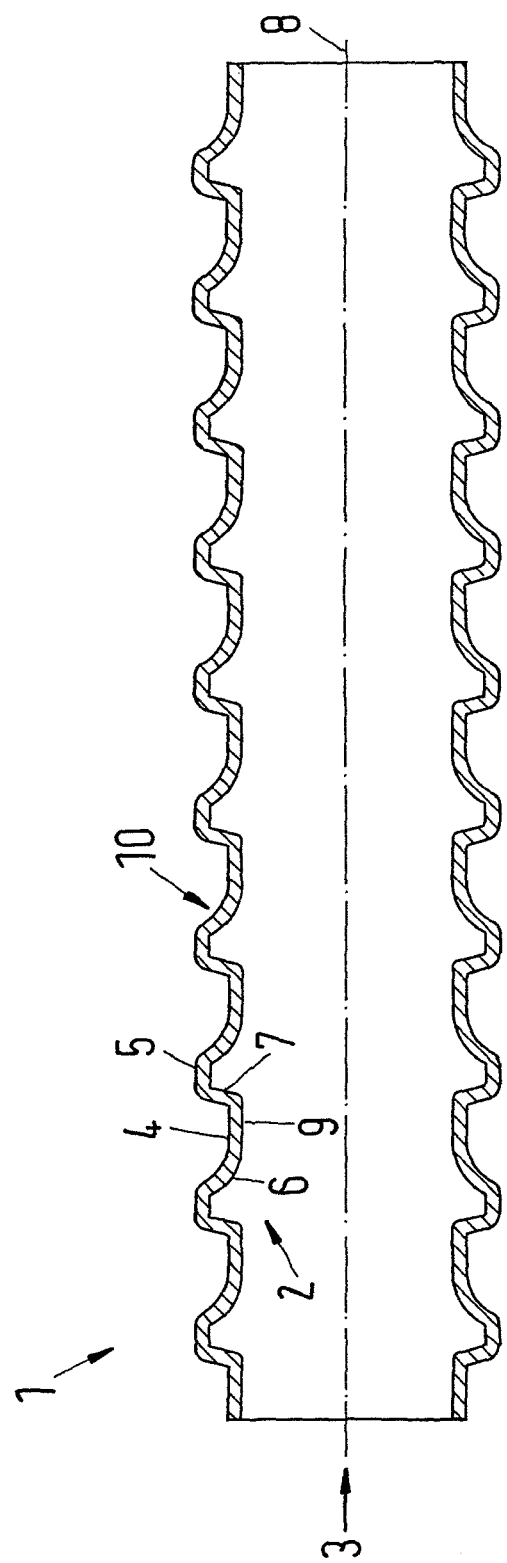

DIRECTIONAL FLUID LINE

CROSS-REFERENCE TO RELATED APPLICATIONS

The present application claims priority under 35 U.S.C. §119 of German Patent Application No. 10 2011 015 388.8, filed on Mar. 29, 2011, the disclosure of which is expressly incorporated by reference herein in its entirety.

BACKGROUND OF THE INVENTION

1. Field of the Invention

The invention relates to a fluid line with an inner contour that has wave peaks and wave troughs. The wave peaks in each case have a front flank and a rear flank.

2. Discussion of Background Information

Fluid lines of this type are referred to, for example, as corrugated pipes. In known corrugated pipes, not only are the inner contour is provided with wave peaks and wave troughs, but also the outer contour. An embodiment of this type is designed to render possible a flexible fluid line which in particular can be curved with relatively small radii. However, due to the wave peaks and the wave troughs of the inner contour, that is, due to the wave peaks projecting inward, a disruption of a fluid flow occurs. Lines of this type therefore have a relatively high flow resistance.

SUMMARY OF THE INVENTION

Embodiments of the invention keep flow losses low.

According to embodiments, a fluid line of the type mentioned at the outset includes a front flank having a shallower inclination angle than a rear flank.

This embodiment utilizes the fact that a flow direction in the fluid line is generally constant. Only a slight deceleration of a fluid flowing through occurs due to the front flank rising in a relatively shallow manner. The axial extension of the wave peak is nevertheless kept low due to the rear flank sloping downward relatively steeply, so that sufficient flexibility of the fluid line is maintained. The formation of a quasi-stationary boundary layer can thereby be prevented by the relatively steep rear flank. This likewise leads to a relatively low flow resistance of the fluid line.

Preferably, the fluid line is embodied or formed as a corrugated pipe and has an outer contour that runs parallel to the inner contour. A very flexible fluid line is thereby obtained. It is also possible thereby to already recognize from outside in which direction a low-flow resistance flow through is possible, which therefore is the preferred flow through direction. Incorrect installation is thereby made more difficult.

Preferably, the front flank has an inclination angle in the range of 50° to 70° and the rear flank has an inclination angle in the range of 80° to 90°. The inclination angle is thereby measured between a rotation axis or symmetry axis of the fluid line and the front flank or the rear flank. The rotation axis thereby runs parallel to the flow through direction. The front flank and the rear flank are thereby generally embodied or formed in a radially continuous manner. An optimized flow behavior results from a corresponding inclination angle of the front flank and the correspondingly larger inclination angle of the rear flank. Flow losses are minimized thereby.

Preferably, the front flank is embodied or formed in a convex manner. The front flank is therefore curved inwards. This results in a relatively marked rise of the front flank starting from the wave trough, while the front flank then merges uniformly into a tip of the wave peak. This results in a transition that is as free from turbulence as possible.

Preferably, the rear flank is embodied or formed in a flat manner. The rear flank thus does not have a convex or a concave curvature. This results in a precisely defined trailing edge and in a very simple embodiment.

Preferably, a tip of the wave peak and the wave trough are embodied or formed in a plateau-shaped manner. The tip of the wave peak and the wave trough thus run parallel to the flow through direction in some regions. A good guidance of the fluid can thereby take place. At the same time, the flexibility of the fluid line can be controlled by means of the axial length of the plateau-shaped tip and of the wave trough.

It is particularly preferred thereby that the tip has a larger axial extension than the wave trough. The influence of the wave troughs on the fluid flowing through is thus kept low.

A flow cross section is determined essentially by the maximum possible free cross section, which is embodied or formed between the wave peaks. The influence of the wave troughs is thereby relatively slight, especially as a transition from the wave troughs to the wave peaks takes place with a relatively shallow inclination angle. The relatively steep rear flank and the short plateau-shaped wave trough are thereby used to generate turbulences in order to thus avoid the formation of a quasi-stationary boundary layer between the fluid flowing through and an inner surface of the fluid line. Overall, low flow losses are obtained thereby.

Preferably, the fluid line is embodied or formed as an extruded plastic pipe, in particular as an extruded polyamide pipe. A fluid line is thus obtained which, while very resistant to solvents, has sufficient flexibility. At the same time, a high durability is obtained. The fluid line can thereby be produced relatively cost-effectively and can also be used in a versatile manner. The desired inner contour can thereby be produced with the aid of an extrusion method relatively simply and thus cost-effectively.

Embodiments of the invention are directed to a fluid line including an inner contour structured with wave peaks and wave troughs. Each wave peak has a front flank and a rear flank, and the front flanks are structured with an inclination angle, relative to a longitudinal axis, shallower than an inclination angle of the rear flanks.

According to embodiments of the present invention, the fluid line may be structured as a corrugated pipe and may further include an outer contour structured to run parallel to the inner contour.

In accordance with other embodiments, the inclination angle of the front flank can be a range of 50° to 70° and the inclination angle of the rear flank can be in a range of 80° to 90°.

According to other embodiments of instant invention, the front flank can be structured and arranged in a convex manner.

According to further embodiments of the invention, the rear flank may be structured in a flat manner.

Moreover, a tip of the wave peak and the wave trough can be structured with a plateau-shape. The tip may have a longer axial extension than the wave trough.

According to still other embodiments, the fluid line can be an extruded plastic pipe. Further, the extruded plastic pipe can be an extruded polyamide pipe.

Embodiments of the instant invention are directed to a directional fluid line including a corrugated pipe having an inner contour with wave peaks and wave troughs that are plateau shaped. The wave peaks have front flanks and rear flanks, relative to flow direction, oriented at different inclination angles relative to a longitudinal axis of the corrugated pipe.

In accordance with embodiments, the inclination angle of the front flanks may be less than the inclination angle of the rear flanks, and a difference between the inclination angle of the front flanks and the rear flanks can be in a range of 10° to 40°.

According to other embodiments of the invention, the rear flanks can be generally flat and the front flanks may be convex surfaces. The convex surfaces can continuously merge into tips of the wave peaks without an edge or a step. Further, the inclination angle of the convex surfaces can include an average of inclination angles along a length of the convex surfaces.

In accordance with still other embodiments, the plateau shape of the wave peak may be longer in the longitudinal direction than the plateau shape of the wave trough.

Embodiments of the invention are directed to a method of forming a fluid line. The method includes forming a corrugated pipe having an inner contour structured with wave peaks having front flanks and rear flanks oriented at an inclined angle to a longitudinal axis of the corrugated pipe. The front flanks are structured with an inclination angle, relative to a longitudinal axis, that is less than an inclination angle of the rear flanks.

According to embodiments, a difference between the inclination angles of the front flanks and the rear flanks can be in a range of 10° to 40°.

According to other embodiments of the invention, the inner contour may be further structured with wave troughs, and the wave peaks and wave troughs can be plateau shaped having surfaces generally parallel to the longitudinal axis.

In accordance with still yet other embodiments of the present invention, the forming may include extruding a plastic material. Further, the plastic material can include polyamide.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

The FIGURE illustrates a cross section through a fluid line according to embodiments of the invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

The FIGURE shows a fluid line 1, which is embodied or formed as a corrugated pipe. Fluid line 1 has an inner contour 2, which is optimized in terms of flow with respect to a predetermined flow through direction, symbolized by arrow 3.

Inner contour 2 has wave peaks 4 and wave troughs 5. A front flank 6 and a rear flank 7 are assigned to or associated with each wave peak 4. An inclination angle of front flank 6 is smaller than an inclination angle of rear flank 7. The inclination angle for flanks 6 and 7 corresponds to an angle between flow through direction 3 and a surface on respective flank 6, 7. Since fluid line 1 is generally embodied or formed in a rotationally symmetrical manner, a rotation (and longitudinal) axis 8 runs parallel to flow direction 3. The inclination angle can thus also be measured between rotation axis 8 and a respective one of front flank 6 or rear flank 7.

According to embodiments, rear flank 7 has a substantially flat surface oriented at an inclination angle of between 80° and 90°, and preferably approx. 85°. In contrast, front flank 6 is embodied or formed in a convex manner, such that the inclination angle of front flank 6 changes depending upon the point along front flank 6 inclination angle is to be determined. Thus, due to the convex embodiment of front flank 6, the inclination angle starting from wave trough 5 is initially relatively steep and then flattens out into wave peak 4. An average inclination angle of front flank 6 is between about 50° and 70°, and preferably approx. 60°.

Wave trough 5 extends over a certain axial length in a plateau-shaped manner, which is generally parallel to rotation axis 8. A wave tip 9 of wave peak 4 likewise shaped in a plateau-shaped manner to generally run parallel to rotation axis 8. Moreover, tip 9 is extends further in the axial direction than wave trough 5. In this manner, front flank 6 steadily merges from wave trough 5 into tip 9, i.e., without the formation of an edge or step. In contrast, a relatively clearly marked edge is present at the transition from tip 9 into rear flank 7. This arrangement leads to the flow separation, such that the formation of a quasi-stationary boundary layer is prevented.

In this example, fluid line 1 is embodied or formed as an extruded plastic pipe, and preferably as an extruded polyamide pipe. However, other embodiments are also possible. Thus the fluid line can also have a metallic material, for example.

An outer contour 10 of fluid line 1 follows inner contour 2, i.e., it is embodied or formed parallel to inner contour 2. A relatively flexible fluid line 1 is thus obtained. At the same time, fluid line 1 can be embodied or formed with a constant material thickness. A desired flexibility of the fluid line is thereby obtained by the formation and arrangement of the wave peaks and the wave troughs according to the embodiments. As a result, a flow resistance is reduced, as compared to conventional corrugated pipes, by the inner contour being embodied or formed in accordance with the embodiments. Thus, flow losses are kept low. Inner contour 2 with wave peaks 4 and wave troughs 5 can be utilized at the same time to prevent the formation of a quasi-stationary boundary layer. Thus, while it is possible to obtain a corrugated pipeline, the flow losses of which approach those of smooth pipes, i.e., of lines with cylindrical inner surfaces, fluid line 1 is optimized for low flow losses in only one flow through direction stream. However, this can also be utilized to measure a flow direction, since a flow resistance is dependent on the flow direction. A flow resistance can be measured relatively easily by a pressure loss occurring.

Overall, fluid line 1 has a flow-optimized and directional inner contour. Moreover, in accordance with embodiments, the flexibility of a corrugated pipe can be retained without the corresponding flow losses previously occurring with corrugated pipes having to be tolerated. Overall, the field of use of the fluid line in accordance with the embodiments is expanded thereby.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A fluid line comprising:
   an inner contour structured with a series of wave peaks and wave troughs; and
   each wave peak having a front flank and a rear flank, and the front flanks being structured with an inclination angle, relative to a longitudinal axis of the fluid line, shallower than an inclination angle of the rear flanks,
   wherein tips of the wave peaks and the wave troughs are structured with a plateau-shape, and
   wherein the fluid line is structured as a corrugated pipe comprising an outer contour parallel to the inner contour, is rotationally symmetric to the longitudinal axis, and is flexible.

2. The fluid line according to claim 1, wherein the inclination angle of the front flank is in a range of 50° to 70° and the inclination angle of the rear flank is in a range of 80° to 90°.

3. The fluid line according to claim 1, wherein the front flank is structured and arranged in a convex manner.

4. The fluid line according to claim 1, wherein the rear flank is structured in a flat manner.

5. The fluid line according to claim 1, wherein the tip has a longer axial extension than the wave trough.

6. The fluid line according to claim 1 being an extruded plastic pipe.

7. The fluid line according to claim 6, the extruded plastic pipe being an extruded polyamide pipe.

8. A directional fluid line comprising:
   a corrugated pipe having an inner contour with a series of wave peaks and wave troughs having tips of the wave peaks and troughs that are plateau shaped;
   the wave peaks having front flanks and rear flanks, relative to flow direction, oriented at different inclination angles relative to a longitudinal axis of the corrugated pipe, and
   wherein the corrugated pipe has an outer contour parallel to the inner contour, is rotationally symmetric to the longitudinal axis, and is flexible.

9. The directional fluid line according to claim 8, wherein the inclination angle of the front flanks is less than the inclination angle of the rear flanks, and a difference between the inclination angle of the front flanks and the rear flanks is in a range of 10° to 40°.

10. The directional fluid line according to claim 8, wherein the rear flanks are generally flat and the front flanks are convex surfaces.

11. The directional fluid line according to claim 10, wherein the convex surfaces continuously merge into tips of the wave peaks without an edge or a step.

12. The directional fluid line according to claim 10, wherein the inclination angle of the convex surfaces comprises an average of inclination angles along a length of the convex surfaces.

13. The directional fluid line according to claim 8, wherein the plateau shape of the wave peak is longer in the longitudinal direction than the plateau shape of the wave trough.

14. A method of forming a fluid line, comprising:
   forming a corrugated pipe having an inner contour structured with a series of wave peaks and wave troughs, the wave peaks having front flanks and rear flanks oriented at an inclined angle to a longitudinal axis of the corrugated pipe,
   wherein the front flanks are structured with an inclination angle, relative to a longitudinal axis, that is less than an inclination angle of the rear flanks,
   wherein tips of the wave peaks and wave troughs are structured with a plateau-shape, and
   wherein the corrugated pipe has an outer contour parallel to the inner contour, is rotationally symmetric to the longitudinal axis, and is flexible.

15. The method according to claim 14, wherein a difference between the inclination angles of the front flanks and the rear flanks is in a range of 10° to 40°.

16. The method according to claim 14, wherein the plateau shaped wave peaks and wave troughs have surfaces generally parallel to the longitudinal axis.

17. The method according to claim 14, wherein the forming comprises extruding a plastic material.

18. The method according to claim 17, wherein the plastic material comprises polyamide.

* * * * *